Oct. 5, 1926.
E. NORDEN
COMBINATION FAUCET
Filed Oct. 20, 1923
1,601,979
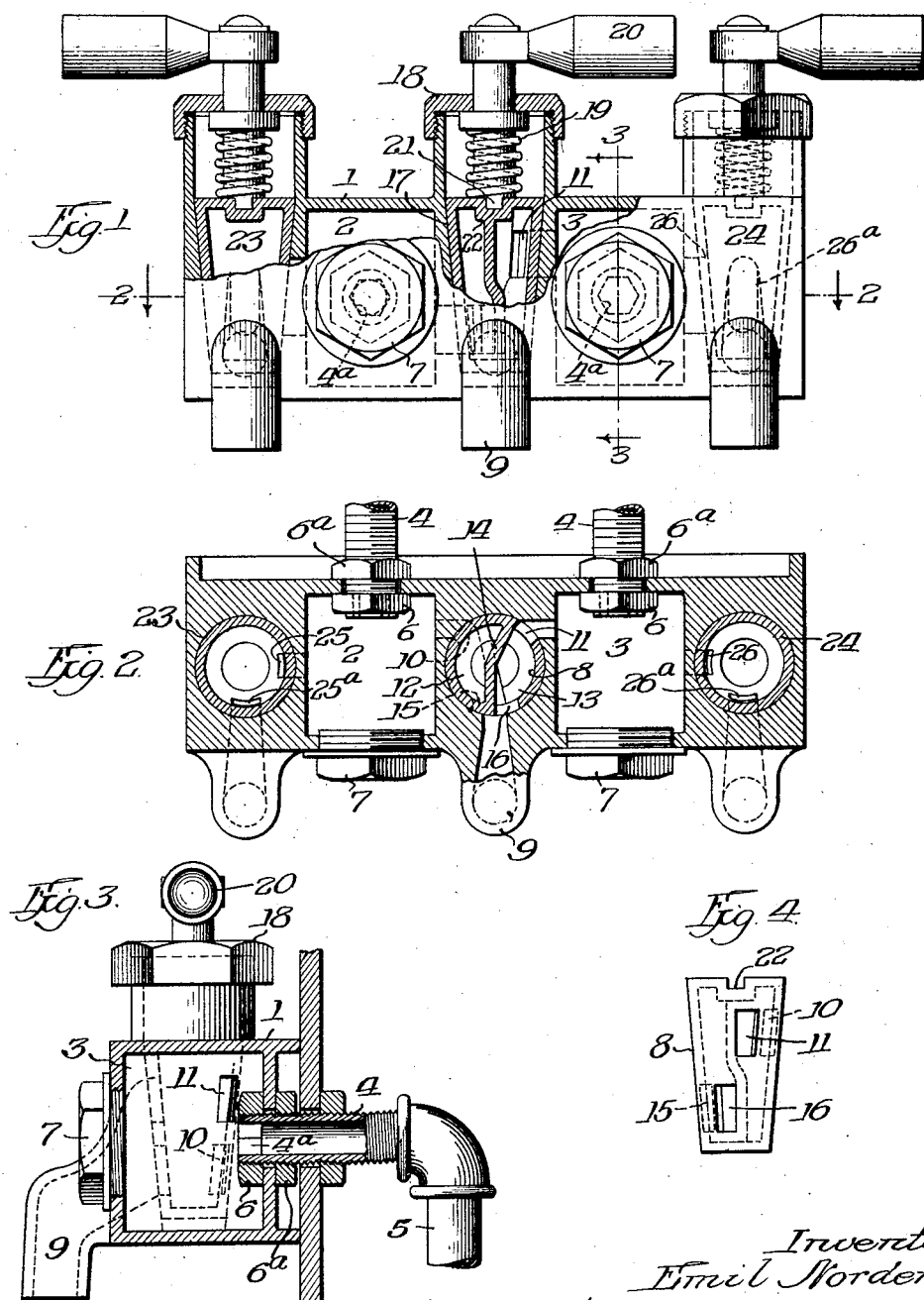

Patented Oct. 5, 1926.

1,601,979

UNITED STATES PATENT OFFICE.

EMIL NORDEN, OF CHICAGO, ILLINOIS, ASSIGNOR OF ONE-HALF TO HENRY KELLNER, OF CHICAGO, ILLINOIS.

COMBINATION FAUCET.

Application filed October 20, 1923. Serial No. 669,672.

The present invention relates to faucets for connection with both a hot water and a cold water pipe, and having means whereby either kind of water, or a combination of the two kinds in any desired proportions, may be drawn at will, and particularly to faucets employing a shell constructed for connection with both the water supply pipes, having a rotary plug positioned intermediately of its two connections, and a common discharge bibb or outlet; some features of the invention relating particularly to faucets having the plug fitted to the shell through means of a tapered bore closed at its larger end by means of a screw cap, a spring being inserted between the screw cap and the plug to keep the latter seated in water-tight relation, and a controlling handle being mounted for rotation in the screw cap and provided with turning connection with the plug that does not restrict the sealing action of the plug under the influence of the spring.

The invention further relates to improved means for attaching a shell of the kind described to the water pipes through which it is to be supplied, namely, by threading attaching nipples in the shell, with outer ends projecting beyond the rear wall of the shell in position to enter connecting sleeves, L's, or the like, at the ends of the water pipes, and with their inner ends exposed within the shell in position to receive a tool by which they may be screwed into the water pipes; removable plugs being formed in the front wall of the shell in axial alignment with the nipples and permitting the introduction of the tool through which the nipples are to be manipulated.

The invention further relates to a mixing faucet equipped for delivering either hot or cold water at will, independently of the mixing faucet, and thereby rendered convenient for use in supplying either kind of water at times when it would be inconvenient to discharge water from the mixing faucet; and to this end, a further feature of the invention consists in combining with a combination faucet shell of the kind already described, hot and cold water discharge valves located on the opposite sides of the respective water supplies from the mixing faucet which lies between the water supplies; said individual water controlling valves being preferably of the same general construction as the mixing valve except for the design of the ports therein, which are preferably in the form of single passageways intersecting the circumference of the valve at points that may be brought into simultaneous communication with the interior space of the shell and with the discharge bibb space, or moved out of registry with one or both of said spaces.

In the accompanying drawing, in which the preferred embodiment of the invention is shown by way of illustration—

Figure 1 is a front elevation partly in section.

Figure 2 is a transverse section on the line 2—2 of Figure 1.

Figure 3 is a horizontal section in the middle plane of Figures 1 and 2; and

Figure 4 is a detail view of the mixing valve.

1 represents the shell of a combination faucet having internal chambers or spaces 2, 3, adapted to communicate through nipples 4 with the water supply pipes 5. Nipples 4 are threaded entirely through the rear walls of the spaces 2, 3, so that their outer ends protrude a suitable distance for threading into supply pipes 5, and their inner ends are exposed for application of the tool by which the nipples may be turned in establishing such connections, and equipped for engagement of such tool, for instance, by facing them internally as shown at 4ª in Figures 1 and 2. Jamb nuts 6, 6ª are provided on each nipple inside and outside of the shell for turning up against the faces of the shell and tightening the connection of the nipple with the shell. In order to afford access to the inner end of each nipple, a plug 7 is threaded into the front wall of the shell, in axial alignment with the nipple.

8 represents a mixing valve located intermediate of the nipples 4, and this valve is constructed with ports and passages so positioned that they may establish simultaneous communication between the chambers 2, 3, and the discharge bibb 9 for tempered water. Thus, the valve 8 has a port 10 through which it communicates with the water space 2, and a port 11 through which it communicates with the water space 3. These ports 10 and 11 are so located that both may be simultaneously half opened to their respective water spaces of the shell, or either may be fully opened to its water space while the other is entirely closed. In providing for flow of water through the valve 8, it is preferably cored to provide valve spaces 12 and 13, separated by a partition 14 so that direct communication will not be established between the water spaces 2 and 3 of the shell, which might otherwise permit flow from a pipe of higher pressure into a pipe of lower pressure; and these valve spaces communicate through ports 15 and 16, respectively, with the bibb or discharge space 9.

Valve 8 is preferably in the form of a plug seated in a tapered bore 17, the larger end of which is closed by a screw cap 18, and the valve is held seated in water-tight relation to the shell by means of a spring 19 confined between it and the cap. To rotate the valve 8 without restraining its response to the seating spring 19, a handle 20 is mounted in the cap 18 and has its lower end constructed with a key 21 that enters a slot 22 in the upper end of the valve plug.

The intake and discharge ports 10 and 15 on one side of the partition 14 are in a different horizontal plane from the ports 11 and 16 on the other side thereof; hence rotation of the plug to the full cut off position will leave both ports on each side securely sealed, and even a rotation through a substantial angle in excess of the usual 90° cut off movement in either direction will not bring the ports of the plug into registry with the ports of the shell, and there will be a double cut off which is quite important in a plug valve.

Independent hot and cold water discharge is provided for by locating at the respective ends of the shell 1, and on opposite sides of the water spaces 2, 3, from the mixing valve 8, valves 23, 24, having ports 25, 25ª, 26, 26ª, adapted to connect the water spaces 2 and 3 with the bibb spaces 27, 28, respectively. Valves 23, 24, are preferably constructed similarly to mixing valve 8 with respect to the method of mounting them in the shell and controlling their rotation, but they, of course, differ in the disposition of their ports and water passages, as each requires but a single way passage.

I claim:

1. In a combination water faucet, a shell having water spaces for receiving hot and cold water and a valve located intermediate of said spaces and adapted to communicate with either thereof, and means for attaching said shell to and establishing comunication between its water spaces and hot and cold pipes, comprising nipples inserted through the rear walls of and having their inner ends exposed within the water spaces and removable closures in the front walls of the water spaces in axial alignment with said nipples.

2. In a combination water faucet, a shell having water spaces adapted for connection with hot and cold water pipes, a mixing valve mounted in said shell intermediate of said water spaces and adapted to draw from both said spaces in varying proportions, and valves mounted in said shell in communication with said water spaces and operable independently of said mixing valve and adapted to draw either kind of water independently of the other.

3. In a combination faucet, a shell constructed with aligned water spaces and having means for attaching it to and bringing said water spaces into communication with hot and cold water pipes, a mixing valve interposed between and communicating with adjacent ends of said water spaces, and independent valves located at and communicating with the ends of the respective water spaces remote from said mixing valve, and adapted to be independently operated to draw either kind of water at will.

4. In a combination faucet, a shell having aligned water spaces, means located at points between the middle of the shell and its respective ends for attaching the shell to and connecting its respective water spaces with hot and cold water pipes, a mixing valve located at the middle of the shell, between said attaching means, and in communication with opposed ends of the water spaces, and independently operable hot and cold water valves located at the respective ends of the shell and in communication with the ends of the water spaces on the opposite sides of the connecting means from said mixing valve.

Signed at Chicago, Illinois, this 18th day of October, 1923.

EMIL NORDEN.